Patented May 25, 1926.

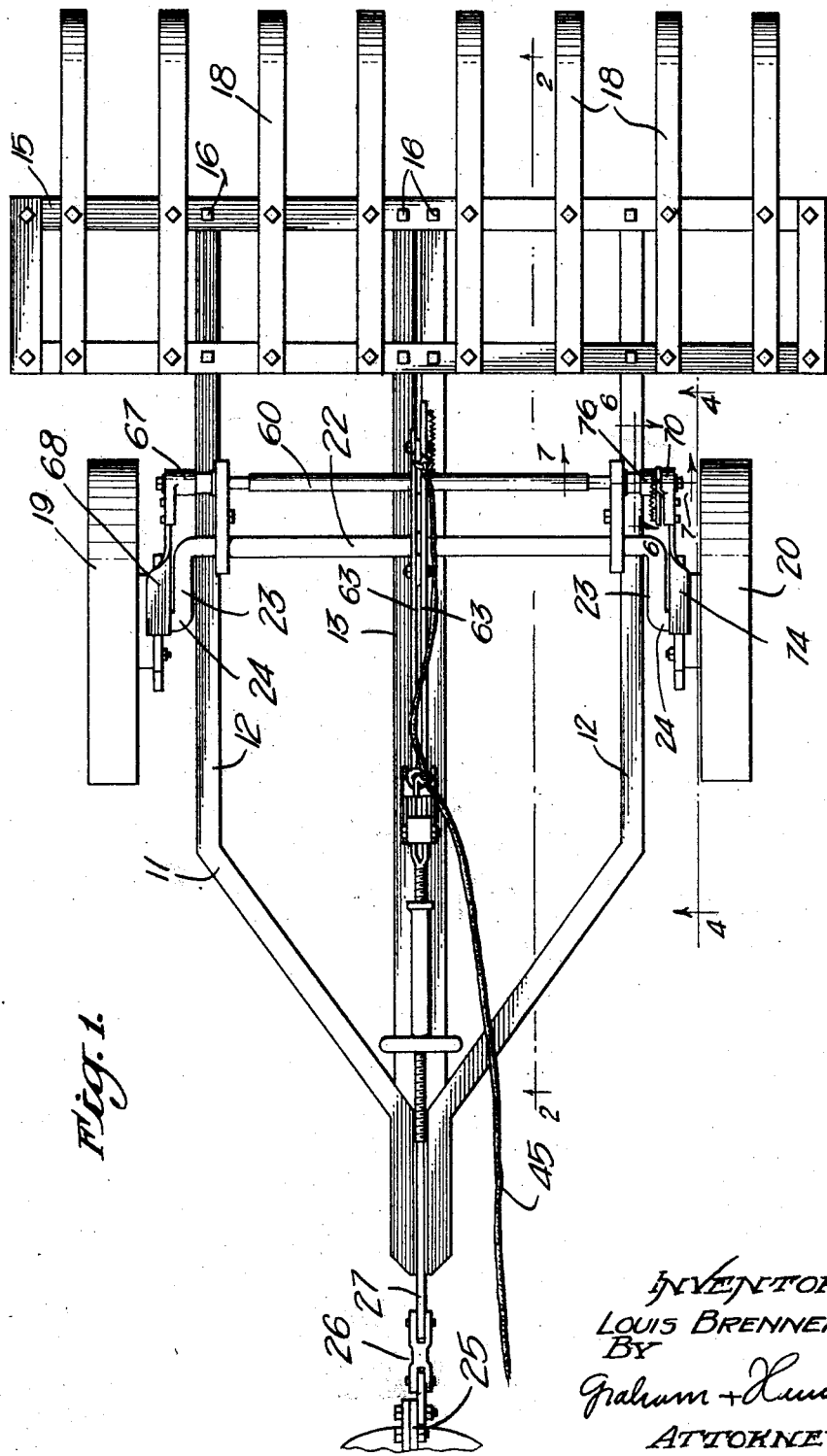

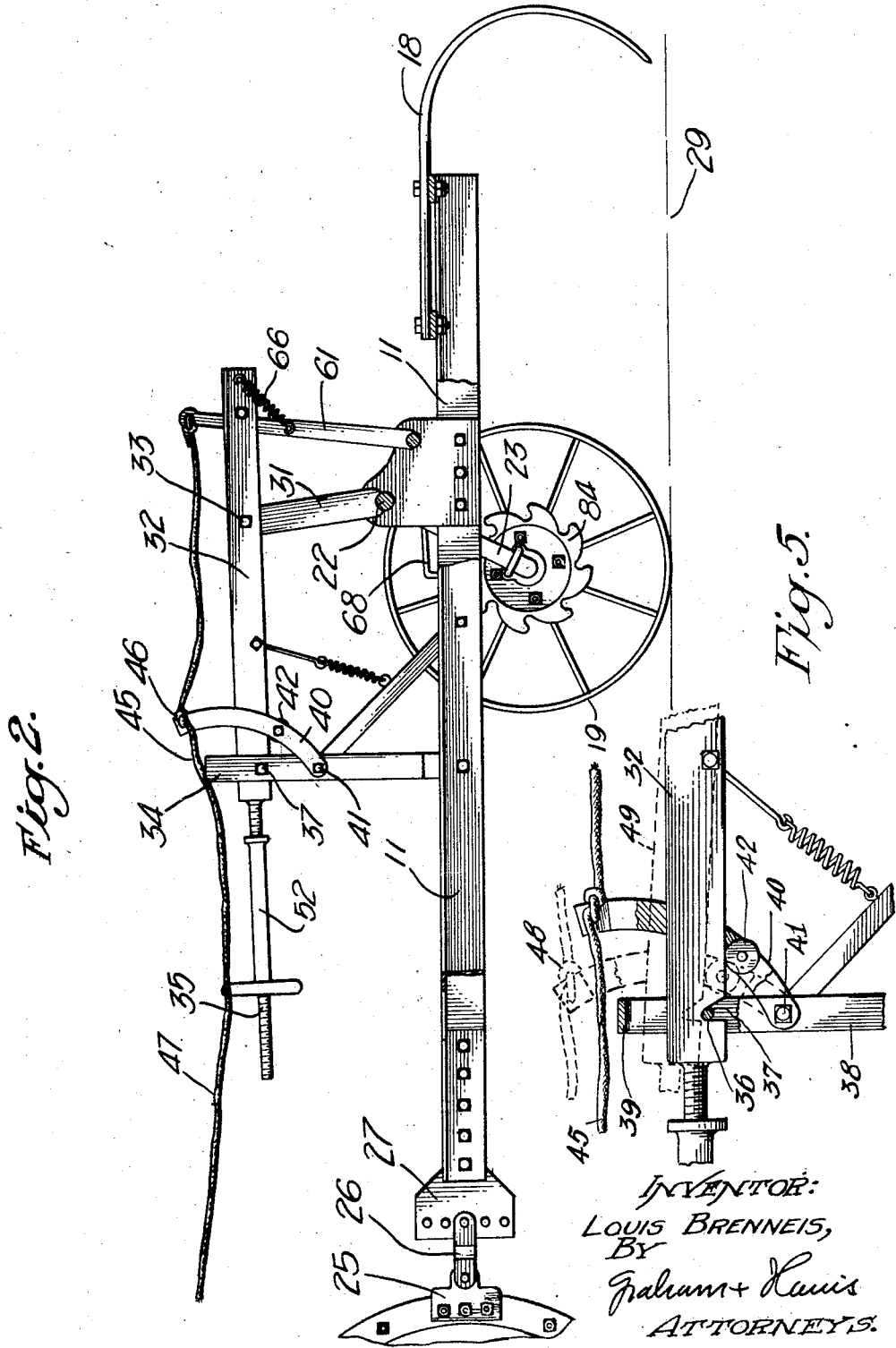

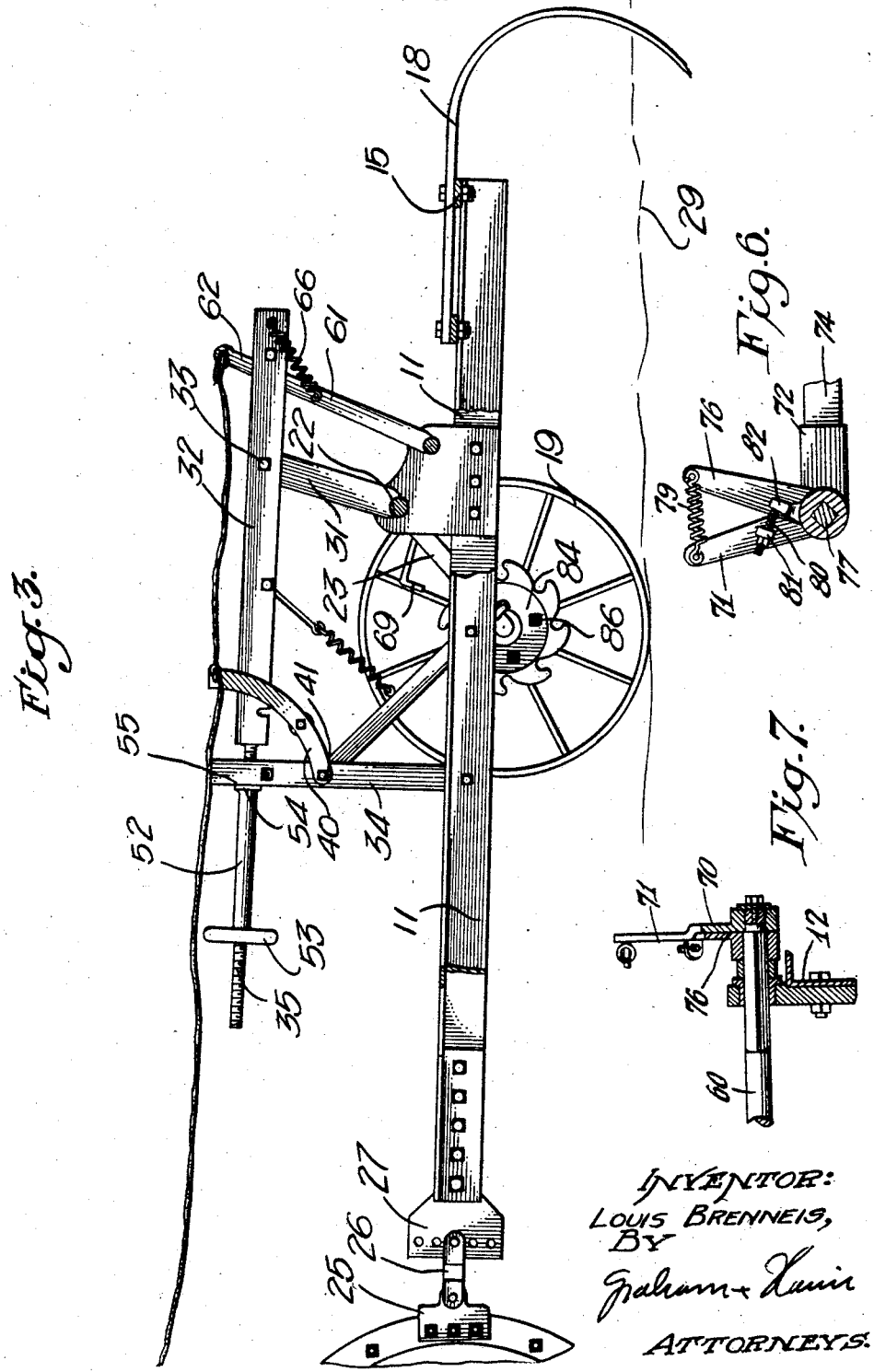

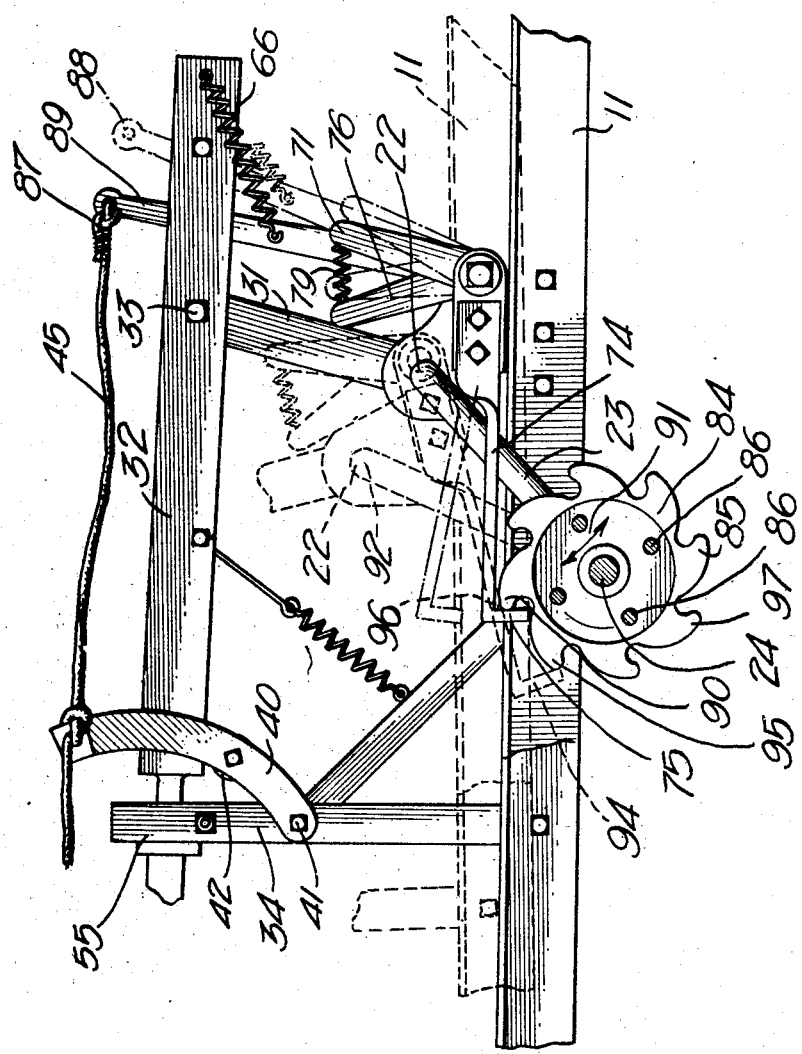

1,586,236

UNITED STATES PATENT OFFICE.

LOUIS BRENNEIS, OF OXNARD, CALIFORNIA, ASSIGNOR TO BRENNEIS MANUFACTURING COMPANY, A CORPORATION OF CALIFORNIA.

POWER LIFT FOR AGRICULTURAL VEHICLES AND IMPLEMENTS.

Application filed March 10, 1924. Serial No. 698,059.

Farm implements for tilling and preparing the soil for planting and implements for cultivating the soil of orchards employ in their operation members such as blades and tines which are drawn through the soil to provide the desired preparation thereof. It is necessary in these devices to provide means for lifting the blades and tines into positions of non-engagement so that the vehicle may be drawn over roads and over portions of ground which it is not desired to cultivate. Such means generally employ mechanism arranged to lift the frame of the implement relative to the wheels, thus accomplishing a raising of the cutting tools. Owing to the weight of the implement and to the resistance of the penetrated soil against removal of the cutting members, it is exceedingly difficult to raise the frame manually.

It is an object of my invention to provide a power lift which will raise the vehicle or implement frame relative to the wheels, by which the frame is supported.

It is a further object of the invention to provide means for actuating the lift mechanism without necessity of the operator leaving his position on the tractive device employed for drawing the agricultural implement.

It is a further object of the invention to provide a lift device which is simple in construction and requires but one rope whereby the lift and releasing action is controlled.

It is a further object of the invention to provide lift mechanism which operates from either or both of a cooperating pair of wheels on the vehicle, thereby making the lift action and also making it possible to lift the vehicle frame while a turn is being made.

The especial advantages of the invention and further objects thereof will be made evident hereinafter.

Referring to the drawings which are for illustrative purposes only,

Fig. 1 is a plan view of an agricultural implement employing the power lift embodying the features of my invention.

Fig. 2 is a section on the line 2—2 of Fig. 1 showing the vehicle frame in raised position.

Fig. 3 is a view similar to Fig. 2 showing the vehicle frame in lowered position.

Fig. 4 is an enlarged section taken upon a plane represented by the line 4—4 of Fig. 1.

Fig. 5 is an enlarged fragmentary partly sectioned view showing the operation of the latch mechanism.

Fig. 6 is a fragmentary section taken on a plane represented by the line 6—6 of Fig. 1.

Fig. 7 is a fragmentary section taken upon a plane represented by the line 7—7 of Fig. 1.

The implement with which my invention is described in this patent application comprises a frame 11 consisting of side bars 12 and a center structure 13. On the rearward ends of the side bars 12 and the structure 13 a supporting frame work 15 is secured by bolts 16, this frame work 15 being arranged to carry soil cutting members such as the cultivator bars 18. For rotatably supporting the frame 11, a pair of wheels 19 and 20 are employed, these wheels being supported by an axle member 22 which forms part of the power lift mechanism. As shown in Figs. 1 to 4, the axle member 22 has downwardly bent portions 23 near the ends thereof and outwardly bent trunnion extremities 24 on which the wheels 19 and 20 are rotatably secured. In Fig. 2 of the drawing, the frame 11 is shown attached to the draw bar 25 of a tractor through a link 26 which extends to the draught plate 27 held at the forward end of the frame 11. In this figure, the frame 11 is shown in raised position in which the cultivator bars 18 are held out of engagement with the soil, as indicated at 29. In this raised position of the frame, the portions 23 of the axle member 22 which function as arms, are in a position nearly vertical, but it is slightly angular so that the trunnions 24 will have a tendency to swing relatively upwardly in a forward direction when it is desired to lower the frame in a manner to accomplish engagement of the cultivator bars 18 with the soil 29. It will, of course, be recognized that the trunnions 24 do not move upwardly relative to the ground upon which the wheels 19 rest, but that the frame 11 moves relatively downwardly with respect to the ground, thereby accomplishing a relatively upward movement of the trunnions with respect to the frame 11. The idea which it is desired to present is that the raising and lowering of the frame is accomplished by a relative movement between the ends of the arm portion 23 and the frame 11 in such a manner that the spacing therebetween will be increased or decreased depending upon whether the frame is being raised or lowered.

Upwardly from substantially the center of the axle of the member 22 there extends a bar 31, to the upper end of which a latch bar 32 is pivotally secured by a bolt 33. The latch bar extends forwardly through a vertical support 34 and has a screw threaded shaft 35 formed or secured upon the forward end thereof. In Figs. 2 and 5, the latch bar is shown in the latched position which it assumes when the frame 11 is held in raised position, due to the substantially vertical position of the arm portions 23. The latching effect of the member 32 is accomplished by a notch 36 which drops over a latch pin 37, which extends between the vertically arranged side members 38 and 39 of the support 34. It will be recognized that this engagement between the notch 36 and the pin 37 prevents rearward movement of the member 31 and therefore prevents forward rotation of the arm portions 23 with result that the vehicle frame 11 is maintained in raised position, as shown in Figs. 2 and 5. A latch release lever 40 is pivoted at 41 to the vertical support 34, this lever 40 having a roller 42 which engages the under edge of the bar 32. Means for actuating the release lever 40 is in the form of a rope 45 secured to the upper end of the lever at 46 and extending forwardly as indicated at 47 to the tractive vehicle. By pulling forwardly with a quick motion, the lever 40 is moved into the position indicated by the dotted lines 48 in Fig. 5, thus lifting the bar 32 out of engagement with the pin 37, as indicated by the dotted lines 49. Upon release of the bar 32, the vertical bar 31 is allowed to swing rearwardly and the arm portions 23 of the shaft 22 are allowed to swing upwardly and forwardly into the positions in which they are shown in Figs. 3 and 4. The rearward movement of the bar 32 is limited by an adjustment member which consists of an interiorly threaded sleeve 52, a forwardly disposed hand wheel 53 and a flanged rearward end 54, which engages the vertical post or support 34, as shown at 55. The angular position into which the arm members 23 may swing is controlled by the rearward movement of the vertical bar 31 which is secured to the latch bar 32 and is, therefore, limited in rearward movement by the adjustment means 52 which by rotation upon the threaded shaft 35 may be moved to various positions, thus regulating the height above the ground to which the frame 11 may be lowered when the latch mechanism is released.

Near the center of a transverse shaft 60 supported on the frame in a position slightly rearward of the axle member 22, there upwardly extends a lever 61, the upper end 62 of which extends between the pair of flat bars 63, Fig. 1, from which the latch bar 32 is formed. The lever 62 is held resiliently in a rearward position by a spring 66, one end of which is secured to the bar 32. On the far end of the shaft 60 is secured a pawl 68 provided with a hub casting 67 and having a downwardly bent hook 69 formed at its forward end. On the near end of the shaft 60, a pawl 74 is turnably mounted as indicated in Fig. 7. This pawl 74 is provided with a hub casting 70 having an upwardly extending arm 71 and the free end of pawl 74 which is bent from flat steel is fixed to a portion 72 of the hub casting 70 and is provided with a downwardly projecting hooked portion 75 similar to the pawl 68. Rigidly secured on the near end of the lateral shaft 60 is an arm member 76 which must rotate with the shaft 60 owing to the square engagement therewith, as indicated at 77 in Fig. 6. Between the upper ends of the arms 71 and 76, a tension spring 79 is stretched, this spring serving to draw the arm 71 toward the arm 76 and to resiliently force the pawl 74 downwardly. The downward movement of the pawl 74 is limited by an adjustment screw 80 mounted in a lug 81 carried on the arm 71, this adjustment screw engaging a lug 82 on the arm 76. As shown particularly in Fig. 4, each of the wheels is provided with a member 84 having forwardly hooked tooth-like projections 85 radially formed thereon. The member 84 is preferably in the form of a plate and is secured concentrically to the hub structure of the wheel by means of bolts 86. In full lines in Fig. 4, the lift equipment is shown in disposal of parts corresponding to the lowered position of the frame 11. Let it be considered that the vehicle is being drawn along and it is desired to raise the frame 11. By pulling forwardly upon the rope 45 which engages the upper end of the lever 61 and 87, this lever as well as the release lever 40 are drawn forwardly. In other words, the lever 61 is moved from the position shown in dotted lines 88 to the position shown at 89 in full lines, which movement causes a rotation of the transverse shaft 60 and a downward movement of the pawls 68 and 74, causing the hooked ends thereof to project into the path of the forwardly rotating tooth projections 85 of the members 84. The action may be described by reference to Fig. 4 alone, it being understood that the action of the pawl 68 is substantially the same as that of the pawl 74. The engagement of a tooth 90, Fig. 4, with the hooked portion 75 of the pawl 74 prevents further forward movement of the tooth 90, with the result that the rotative action of the wheel upon the trunnion end 24 of the shaft member 22 produces a downward and rearward movement of the arm portion 23 in the direction indicated by the arrow 91. Owing to the fact that the wheel 19 is resting upon the ground, the relative downward movement of the arm produces an upward and forward swing of the axle 22 into a position such as indicated by the dotted lines 92.

It will be recognized that the entire frame 11 is also moved upwardly and forwardly at this time and that the hooked end 75 of the pawl 74 is carried toward the final position indicated by the dotted lines 94 and the tooth 90 as rotated into the position indicated at 95. At this time the relative positions of the pawl 74 and the arm 23 are such that the succeeding teeth of the member 84 engage the under face of the pawl 74, as indicated at 96, thus causing the hooked end 75 to be relatively lifted from engagement with the tooth 90, as shown by the dotted lines 94 which represent the hooked end 75 in engagement with the tooth 90 in its forward position 95. At this time, however, the latch member has been moved forwardly so that the notch 36 is in a position coincident with the pin 37, or possibly slightly forward thereof, so that when the hooked end of the pawl 74 is forced out of engagement with the tooth 90, the rearward movement of the latch member 42 is prevented by the engagement of the notch 36 with the pin 37 and forward and upward rotation of the arm members 23 thereby prevented. It will be recognized that as soon as the hooked end 75 is released from engagement with the tooth 90, the lever 61 will be drawn rearwardly by the spring 66 and the pawls 68 and 74 thereupon raised to the position shown in Fig. 2. The release of the lift mechanism and the corresponding lowering of the frame 11 has been previously described and therefore need not be further considered.

It is evident, owing to the fact that the wheels are independently turnable, that the teeth of the members 84 mounted upon the separate wheels 19 and 20 will not at all times be in alignment; therefore, the pawl 74 is resiliently secured upon the lateral shaft 60 so that in event of disalignment of the teeth 85 of the separate members 84, the hooked end 69 of the pawl 68 may be caused to fully engage a tooth 85 on its cooperating member 84 while the hooked end 75 of the pawl 74 may at this time rest in a position on the inclined face 97, Fig. 4, between two adjacent teeth. The use of a pair of toothed members 84 and a pair of pawls of the type described at each side of the machine enables the employment of the combined lifting action of two wheels, thus eliminating considerable torsional strain upon the axle member 22; and also permits the raising of the frame 11 while a turn is being made, it being recognized that in making a sharp turn, one wheel of the vehicle may remain stationary; therefore, if but a single pawl and a cooperating tooth member 84 were employed at the stationary wheel, it would be impossible to lift the frame 11 while turning on this wheel, although it will be recognized that a lift could be made while turning in the opposite direction.

I claim as my invention:

1. In an implement, the combination of: a frame; a transverse crank axis journaled on said frame having crank arms at its opposite ends terminating with horizontally disposed wheel trunnions; wheels journaled on said trunnions; a latch for holding said crank axle in raised position to elevate the frame; a ratchet secured to each of said wheels; a transverse shaft; a lever secured to said shaft: a first pawl rigidly secured to the shaft and adapted to engage one of said wheel ratchets; and a second pawl yieldingly mounted on said shaft and adapted to engage the other of said wheel ratchets.

2. In an implement, the combination of: a frame; a transverse crank axle journaled on said frame and having crank arms at its opposite ends terminating with horizontally disposed wheel trunnions; wheels journaled on said trunnions; an arm on said crank axle; a latch bar pivoted on said arm adapted to engage the frame for holding said crank axle in raised position; a ratchet secured to each of said wheels; a transverse shaft; a lever secured to said shaft and resiliently connected to said latch bar; means for simultaneously releasing said latch and rotating said levers; a first pawl rigidly secured to said shaft and adapted to engage one of said wheel ratchets; and a second pawl yieldingly mounted on said shaft and adapted to engage the other of said wheel ratchets.

3. In an implement, the combination of: a frame; a transverse crank axle journaled on said frame and having crank arms at its opposite ends terminating with horizontally disposed wheel trunnions; wheels journaled on said trunnions; an arm on said crank axle; a latch bar pivoted on said arm and adapted to engage the frame for holding said crank axle in raised position; a ratchet secured to each of said wheels; a transverse shaft; a lever secured to said shaft and yieldingly connected to said latch bar; means for simultaneously releasing said latch and rotating said lever; a first pawl rigidly secured on one end of said shaft and adapted to engage one of said wheel ratchets; a second pawl turnably mounted on the other end of said shaft and adapted to engage the other of said wheel ratchets; and an arm rigidly secured to said shaft, said arm and said second pawl being yieldingly held towards each other.

In testimony whereof, I have hereunto set my hand at Oxnard, California, this 25th day of February, 1924.

LOUIS BRENNEIS.